United States Patent
Hertinger

(10) Patent No.: US 6,901,309 B2
(45) Date of Patent: May 31, 2005

(54) PROGRAMMING PLATFORM FOR GENERATING PARTS PROGRAMS FOR MACHINE TOOLS OR PRODUCTION MACHINES

(75) Inventor: Klaus Hertinger, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/783,964

(22) Filed: Feb. 20, 2004

(65) Prior Publication Data

US 2004/0181305 A1 Sep. 16, 2004

(30) Foreign Application Priority Data

Feb. 20, 2003 (DE) .......................... 103 07 261

(51) Int. Cl.$^7$ .............................................. G06F 19/00
(52) U.S. Cl. ...................... 700/174; 700/108; 700/143; 901/14; 318/568.11
(58) Field of Search ................................ 700/174, 143, 700/108, 17, 254, 245, 258, 259, 260, 262; 701/211–212, 215, 301; 901/1, 14, 5, 9; 318/568.11

(56) References Cited

U.S. PATENT DOCUMENTS

| | | | | |
|---|---|---|---|---|
| 5,880,956 A | * | 3/1999 | Graf | 700/86 |
| 5,914,876 A | * | 6/1999 | Hirai | 700/87 |
| 6,290,571 B1 | * | 9/2001 | Dilger et al. | 451/5 |
| 6,678,582 B2 | * | 1/2004 | Waled | 700/245 |

FOREIGN PATENT DOCUMENTS

| | | |
|---|---|---|
| DE | 199 00 117 A1 | 7/2000 |
| DE | 101 14 811 A1 | 10/2002 |

* cited by examiner

*Primary Examiner*—Kidest Bahta
(74) *Attorney, Agent, or Firm*—Henry M. Feiereisen

(57) ABSTRACT

A programming platform for generating parts programs for a machine tool or production machine is described. A user inputs an instruction to an interpreter integrated in the programming platform, a simulator then simulates an effect of the instruction, and a display graphically displays to the user the effect of the instruction in the form of a two-dimensional or three-dimensional representation. A collision monitor monitors the effect of the instruction to determine if a collision between two or more machine elements and/or workpieces and/or tools can be expected. The programming platform hence represents a homogeneous integrated programming environment for generating, simulating and testing of parts programs for machine tools and production machines.

11 Claims, 2 Drawing Sheets

PROGRAMMING PLATFORM FOR GENERATING PARTS PROGRAMS FOR MACHINE TOOLS OR PRODUCTION MACHINES

CROSS-REFERENCES TO RELATED APPLICATIONS

This application claims the priority of German Patent Application, Serial No. 103 07 261.6, filed Feb. 20, 2003, pursuant to 35 U.S.C. 119(a)–(d), the disclosure of which is incorporated herein by reference.

BACKGROUND OF THE INVENTION

The present invention relates to a programming platform for generating parts programs for machine tools or production machines. In the application, the term "production machine" is used here in a generic sense and includes also robots which generally follow the concepts outlined here.

When a workpiece is machined with a machine tool or production machine, axles and/or spindles can be moved during the production process. The axles and/or spindles which here describe a relative movement between a tool and a workpiece, are referred to as so-called machining units. In the production process, the axles and/or spindles are assigned to a so-called channel. The move commands to be transmitted to the machining unit are defined and described in the channel in the form of a parts program. The parts program is transmitted inside a numerical controller of the machine to an interpreter which converts the parts program to a corresponding machine code.

For increasing the productivity, machine tools or production machines frequently include several machining units which can be moved simultaneously. These machine tools or production machines are referred to as multi-channel machines and can include several independent parts programs defining a number of relative movements between workpiece(s) and tool(s) that are simultaneously interpreted and executed by multiple channels, thereby allowing simultaneous machining of one or more of the workpieces. Each channel can have a dedicated parts program.

The parts program typically consists of a standard ASCII source code in conformance with DIN 66025/ISO as well as optional additional manufacturer-specific or machine-specific expansions and/or upgrades. The parts programs are typically displayed and processed in ASCII format using an editor, in particular a text editor. Also known are programming systems for programming the machine or generating parts programs, whereby the programming systems can be used to generate specific task-oriented parts programs in a so-called task-oriented step diagram which can be graphically displayed to the user. A step diagram facilitates provides a structured view and processing of the various parts programs which facilitates programming and operating the machine.

Many different systems and environments are in use at the present time for generating, simulating and testing parts programs, which requires separate operating steps. The parts program, or the various programs used for operating multi-channel machines, are generated and programmed, whereafter the parts programs are simulated and tested on a different system environment. Finally, the parts programs are executed on the machine.

It would therefore be desirable and advantageous to provide an improved programming platform for generating parts programs, which obviates prior art shortcomings and is able to specifically execute and test the parts programs in a homogeneous integrated programming environment that eliminates the need to provide dedicated environments for the generation, testing and implementation phases of the parts programs.

SUMMARY OF THE INVENTION

According to one aspect of the present invention, a programming platform for generating parts programs for a machine tool or production machine includes an interpreter adapted to receive an instruction from a user, a simulator that simulates an effect of the instruction, a display for graphically displaying to the user the effect of the instruction in form of a two-dimensional or three-dimensional representation, and a collision monitor that monitors the effect of the instruction with respect to a collision between at least two components selected from the group consisting of machine elements, workpieces and tools.

According to another aspect of the invention, a method for a generating parts program for a machine tool or production machine includes the steps of inputting an instruction into an interpreter integrated in a programming platform, simulating an effect of the instruction with a simulator integrated into the programming platform, graphically displaying the effect of the instruction to a user form in form of a two-dimensional and/or three-dimensional representation, and monitoring with a collision monitor that is integrated in the programming platform the effect of the instruction with respect to a collision between at least two components selected from the group consisting of machine elements, workpieces and tools.

According to an advantageous feature of the invention, the instruction can include an instruction that can be marked by the user, or a program segment of the parts program. This ensures that instructions and/or program segments of parts program that are marked in any form by the user can be simulated in one process, graphically displayed and monitored for a possible collision.

According to another advantageous feature of the invention, the interpreter can automatically expand the syntax of an instruction that the user has inputted as individual characters and attempt to form a meaningful syntax character sequence. This is feasible if the inputted syntax is unambiguous. Alternatively, if the inputted syntax is ambiguous, then the user can be prompted to make a selection from at least one possible syntax character sequence. This enables a faster generation and/or programming of the parts programs.

According to yet another advantageous feature of the invention, the interpreter can check the syntax of the instruction each time an instruction is entered by the user. In this way, the interpreter can alert the user to a defective instruction directly after the instruction has been entered.

According to still another advantageous feature of the invention, the collision monitor can identify a collision, whereafter a machine movement corresponding to the identified collision can be highlighted on the display, and the instruction or instructions causing the collision can be displayed on the display, for example, in ASCII code. Alternatively or in addition, an associated processing step can be graphically displayed. In this way, the user can quickly find an error in the parts program.

According to another advantageous feature of the invention, the programming platform can be a stand-alone system, an online system implemented directly on the machine tool or production machine in form or a server system in a networked environment, or a combination thereof. A programming platform implemented in this manner can operate or be used in many different system environments.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
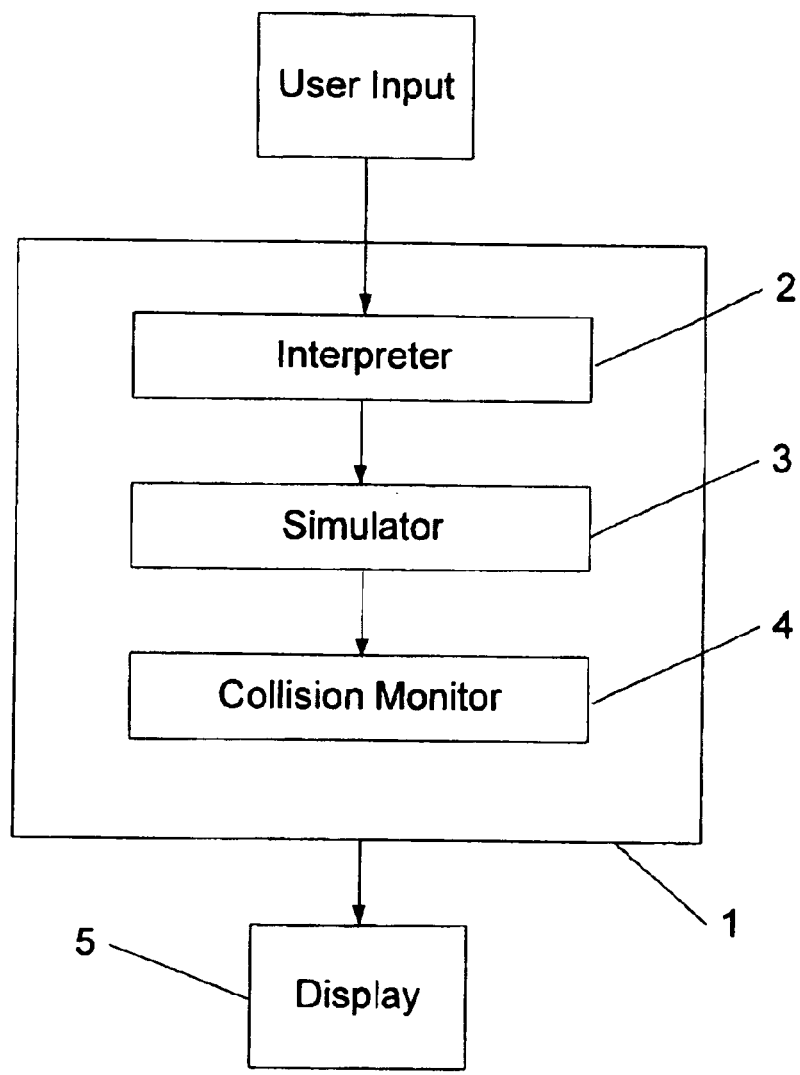
FIG. 1 shows a programming platform according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a programming platform 1 according to the invention. An interpreter 2, a simulator 3, and a collision monitor 4 are integral components of the programming platform 1. Each instruction entered by a user is received by the interpreter 2 and immediately translated into machine code. The simulator 3 integrated in the programming platform then simulates the effect of the instruction and causes the effect of the instruction to be graphically displayed to the user in form of a two-dimensional and/or three-dimensional image or diagram, for example, on a display 5. The collision monitor 4 which is also integrated in the programming platform monitors the effect of the instruction with respect to possible collisions between machine elements and/or workpieces and/or tools.

This enables the user, after entering a new instruction in the parts program, to graphically view and analyze its effect.

In addition, the user can also mark several instructions or entire program segments and simulate these instructions or program segments with the simulator 3 integrated in the programming platform 1. The collision monitor 4 can immediately graphically display to the user possible collisions as well as identify the collisions and their causes.

When the collision monitor 4 detects a collision, the planned machine movement is marked in the graphic simulation in color or is otherwise indicated, for example by flashing markings, and the instruction or instructions causing the collision can be indicated in the parts program in ASCII code or as a step diagram whereby as step can include a combination of several instructions written in ASCII code. This provides the user with a simple and effective error detection. The instructions leading to the collision(s) can also be displayed as a color marking.

To support or speed up the character-wise syntax input of an instruction by the user, the interpreter 2 expands automatically the syntax character sequence entered by the user to form a completed instruction or, if the entered syntax character sequence is ambiguous, offers the user to make a selection from one or more likely additional syntax character sequences. This includes definitions that are known to the interpreter 2, for example macros.

After each instruction is completed, the interpreter 2 checks the syntax of the instruction and if necessary outputs an error message. It will be understood that the function of expanding the automatic syntax character sequence as well as the function of checking the syntax of the instruction can optionally be switched on or off by the user.

The simulator 3 simulates each instruction translated by the interpreter into machine code as well as instructions or program segments marked by the user, and displays these to the user in form of a two-dimensional and/or three-dimensional representation, for example, on a display screen. Both the workpiece as well as the surrounding workspace can be displayed in graphic form. The two-dimensional representation can be displayed in one or more planes, including a three-dimensional representation with different changeable viewing angles, cross-sections (e.g., semi sections or full sections) with different modes for representing the tool, e.g., tool center path (without tool data), cutting tool and/or complete tool bodies, which can includes holders and magazines, for example based on default data sets or on geometric data that have been partially or entirely imported. The geometric data required for simulating the bodies to be simulated (e.g., workpieces, tools and machine elements) can be obtained from commercial CAD systems.

In parallel with the simulation, the collision monitor 4 checks the effect of the instruction, or the effect of the marked instructions or the marked program segments, which are simulated at that instance, with respect to a collision between machine elements. When a collision is identified, the planned machine movement is marked in color in the graphic simulation. The instructions in the parts program that cause the collision are indicated in ASCII code and/or in the form of processing steps.

The programming platform in the depicted embodiment also includes a so-called monitor mode, wherein the simulator 3 displays during the manufacturing process the actual view of the machine. Accordingly, the user can be presented with a virtual view of, for example, the workspace of the machine during the actual manufacturing operation. This obviates the need for other visualization tools, such as a camera installed in the workspace of the machine.

The programming platform can also be implemented as a so-called standalone system on a separate computer that is not networked and/or directly on the machine in the form of an online system and/or on a server system in a networked environment.

When employing a standalone system, the programming platform can be implemented, for example, on a personal computer or a workstation. Stored data sets can be used for working with different specific existing types of machine or with so-called universal machine base sets which do not include specifics of individual machine types. Universal machine base sets can be used, for example, when a parts program is generated without having an actual machine in mind on which the workpiece can or will be produced.

The programming platform can also be integrated directly on the machine in form of an online system. The programming platform can then, for example, directly access the characteristic parameters of the machine even when these parameters change online. The programming platform in this case operates only with the data sets specifically stored for the particular machine. In addition, the aforedescribed monitor mode is available whereby the actual view of the machine is displayed during the manufacturing process so that the user is provided with a virtual graphic image of the workpiece(s) as well as the surrounding workspace.

Figure 2:
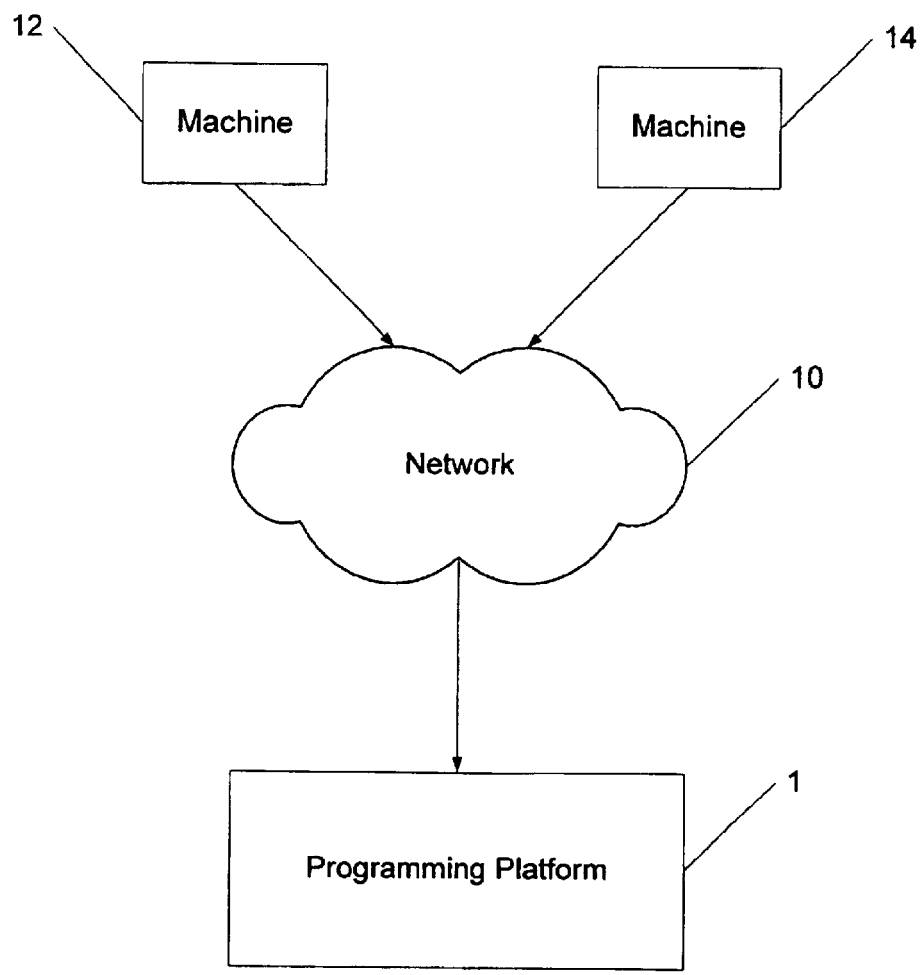
FIG. 2 shows a networked programming platform of FIG. 1.

As shown schematically in, FIG. 2, the programming platform 1 can also be implemented on a server system in a networked environment. Exemplary machine tools or production machines 12, 14 are connected via network 10 to the programming platform 1. In the networked environment, the program, with the help of the programming platform 1 of the invention, can then be generated at a remote programming location which can in principle be located at an arbitrary distance from the machine. Because of the individual machines 12, 14 are networked with each other and with the programming platform 1 at the programming location via network 10, the parts programs to be modified can be transferred from the respective machine 12, 14 to the programming location via a network 10. The parts programs can be modified on the programming platform 1, tested and subsequently transferred back to the machine 12, 14. In addition, the server system and/or in the programming platform 1 of the invention can be used to program, test and monitor—with the help of the monitor mode—machines located at any distance from the programming platform.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A programming platform for generating a parts program for a machine tool or production machine, comprising:
   an interpreter receiving from a user an instruction commensurate with a movement of an element, and translating the instruction into a machine code;
   a simulator receiving the machine code for simulating an effect of the instruction;
   a collision monitor for monitoring the simulated effect of the instruction and identifying the presence of a collision as a result of the instruction; and
   a display for graphically displaying to the user the simulated effect of the instruction in form of a two-dimensional or three-dimensional representation by highlighting the collision on the display and displaying in ASCII code the instruction causing the collision.

2. The programming platform of claim 1, wherein the instruction includes an instruction marked by the user or a program segment of the parts program.

3. The programming platform of claim 1, wherein the interpreter automatically expands a syntax of an instruction inputted by the user in form of individual characters so as to form a meaningful syntax character sequence if said inputted syntax is unambiguous, or presents the user with at least one possible syntax character sequence to make a selection if said inputted syntax is ambiguous.

4. The programming platform of claim 3, wherein the interpreter checks the syntax of the instruction each time an instruction is entered by the user.

5. The programming platform of claim 1, wherein the programming platform is selected from the group consisting of a stand-alone system, an online system implemented directly on the machine tool or production machine, and a server system in a networked environment.

6. The programming platform of claim 1, wherein the programming platform includes a monitor operating mode wherein an actual view of the machine is graphically displayed during a production process.

7. A method for generating parts program for a machine tool or production machine, comprising the steps of:
   inputting into an interpreter an instruction commensurate with a movement of an element and translating the instruction into a machine code;
   transferring the machine code to a simulator for simulating an effect of the instruction;
   monitoring with a collision monitor the simulated effect of the instruction and identifying the presence of a collision as a result or the instruction; and
   graphically displaying the simulated effect of the instruction to a user in form of a two-dimensional or three-dimensional representation by highlighting and dismaying the collision on the display and displaying in ASCII code the instruction causing the collision.

8. The method of claim 7, further comprising marking the instruction or a program segment of the parts program.

9. The method of claim 7, further comprising expanding a syntax of an instruction that is inputted in form of individual characters so as to form a meaningful syntax character sequence if said inputted syntax is unambiguous, or presenting the user with at least one possible syntax character sequence to aid the user in making a selection if said inputted syntax is ambiguous.

10. The method of claim 9, and further comprising checking the syntax of the instruction each time an instruction is entered by the user.

11. A The method of claim 7, and further comprising graphically displaying an actual view of the machine during a production process.

* * * * *

UNITED STATES PATENT AND TRADEMARK OFFICE
CERTIFICATE OF CORRECTION

PATENT NO. : 6,901,309 B2 Page 1 of 1
DATED : May 31, 2005
INVENTOR(S) : Klaus Hertinger It is certified that error appears in the above-identified patent and that said Letters Patent is hereby corrected as shown below:

Column 6,
Line 24, after "generating" insert -- a --;
Line 34, change "or" to -- of --;
Line 37 to 38, change "dismaying" to -- displaying --.

Signed and Sealed this

Twenty-seventh Day of September, 2005

JON W. DUDAS
*Director of the United States Patent and Trademark Office*